(12) United States Patent
Priestley et al.

(10) Patent No.: US 9,740,669 B2
(45) Date of Patent: Aug. 22, 2017

(54) EFFICIENT EVENT DELEGATION IN BROWSER SCRIPTS

(71) Applicant: Facebook, Inc., Menlo Park, CA (US)

(72) Inventors: Evan Jerome Priestley, Burlingame, CA (US); Ashwin Ravindra Bharambe, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 351 days.

(21) Appl. No.: 14/636,390

(22) Filed: Mar. 3, 2015

(65) Prior Publication Data
US 2015/0178254 A1 Jun. 25, 2015

Related U.S. Application Data

(63) Continuation of application No. 13/615,151, filed on Sep. 13, 2012, now Pat. No. 9,003,278, which is a continuation of application No. 12/879,788, filed on Sep. 10, 2010, now Pat. No. 8,307,277.

(51) Int. Cl.
| | |
|---|---|
| *G06F 17/00* | (2006.01) |
| *G06F 17/22* | (2006.01) |
| *G06F 17/30* | (2006.01) |
| *G06F 9/54* | (2006.01) |

(52) U.S. Cl.
CPC .......... *G06F 17/2247* (2013.01); *G06F 9/542* (2013.01); *G06F 17/30076* (2013.01); *G06F 17/30914* (2013.01)

(58) Field of Classification Search
CPC ................................................ G06F 17/30076
See application file for complete search history.

(56) References Cited

U.S. PATENT DOCUMENTS

| | | | | |
|---|---|---|---|---|
| 5,619,632 A | * | 4/1997 | Lamping | G06T 11/206 345/441 |
| 5,926,823 A | * | 7/1999 | Okumura | G06F 17/2247 715/236 |
| 6,188,401 B1 | * | 2/2001 | Peyer | G06F 17/30899 707/E17.119 |

(Continued)

OTHER PUBLICATIONS

United States Office Action, U.S. Appl. No. 13/615,151, Aug. 12, 2014, fourteen pages.

(Continued)

*Primary Examiner* — Laurie Ries
(74) *Attorney, Agent, or Firm* — Fenwick & West LLP

(57) ABSTRACT

Event handlers associated with markup language documents represented in a web browser are identified efficiently in response to an event. The markup language document is represented as a hierarchical structure comprising nodes and edges. Nodes are associated with node types, each node type defining how descendants of the node respond to events. The markup language document provides mappings of sets of node types to sets of handlers. In response to an event associated with a node, the types of nodes encountered in a path connecting the node with the root node are identified. Handler sets of the node types encountered in the path connecting a node with the root node are used to determine the handlers to be executed in response to the event. Data is associated with nodes to allow handler code to distinguish between nodes of the same node type.

20 Claims, 7 Drawing Sheets

(56) References Cited

U.S. PATENT DOCUMENTS

| | | | | |
|---|---|---|---|---|
| 6,268,852 B1* | 7/2001 | Lindhorst | | G06F 8/34 |
| | | | | 715/234 |
| 6,910,040 B2* | 6/2005 | Emmick | | G06F 17/30917 |
| 6,938,204 B1* | 8/2005 | Hind | | G06F 17/30908 |
| | | | | 707/999.101 |
| 6,981,212 B1* | 12/2005 | Claussen | | G06F 17/30896 |
| | | | | 707/E17.118 |
| 7,086,042 B2* | 8/2006 | Abe | | G06F 17/2247 |
| | | | | 717/143 |
| 7,168,035 B1* | 1/2007 | Bell | | G06F 17/2247 |
| | | | | 715/234 |
| 7,197,515 B2* | 3/2007 | Rivers-Moore | | G06F 17/2247 |
| 7,240,279 B1* | 7/2007 | Chartier | | G06F 17/2247 |
| | | | | 707/999.1 |
| 7,240,280 B2* | 7/2007 | Jolley | | G06F 17/30581 |
| | | | | 707/E17.032 |
| 7,277,588 B2* | 10/2007 | Fisher | | H04N 21/23412 |
| | | | | 375/E7.083 |
| 7,337,392 B2* | 2/2008 | Lue | | G06F 17/30905 |
| | | | | 707/E17.121 |
| 7,392,239 B2* | 6/2008 | Fontoura | | G06F 17/3061 |
| 7,409,636 B2* | 8/2008 | Meijer | | G06F 17/30932 |
| | | | | 715/255 |
| 7,426,703 B2* | 9/2008 | Cheung | | G06F 9/4446 |
| | | | | 715/853 |
| 7,437,666 B2* | 10/2008 | Ramarao | | G06F 17/2247 |
| | | | | 707/E17.006 |
| 7,464,331 B2* | 12/2008 | Patch | | G06F 17/2247 |
| | | | | 715/234 |
| 7,509,374 B2* | 3/2009 | Trinh | | G06F 17/30905 |
| | | | | 709/203 |
| 7,627,814 B1* | 12/2009 | Soldan | | G06F 17/2247 |
| | | | | 715/236 |
| 7,650,349 B2* | 1/2010 | Yeh | | G06F 8/20 |
| | | | | 715/200 |
| 7,823,190 B1* | 10/2010 | Kacarov | | H04L 63/06 |
| | | | | 380/278 |
| 7,865,871 B2* | 1/2011 | Maron | | G06F 8/315 |
| | | | | 717/106 |
| 8,065,685 B2* | 11/2011 | Cermak | | G06F 17/2247 |
| | | | | 715/236 |
| 8,082,493 B2* | 12/2011 | Sthanikam | | G06F 17/2211 |
| | | | | 715/234 |
| 8,117,591 B1* | 2/2012 | Michelsen | | G06F 8/34 |
| | | | | 717/109 |
| 8,954,989 B1* | 2/2015 | Colton | | G06F 9/54 |
| | | | | 709/203 |
| 9,201,558 B1* | 12/2015 | Dingman | | G06F 3/048 |
| 2004/0103374 A1* | 5/2004 | Chishima | | G06F 17/30899 |
| | | | | 715/234 |
| 2004/0148571 A1* | 7/2004 | Lue | | G06F 17/30905 |
| | | | | 715/239 |
| 2004/0247292 A1* | 12/2004 | Chung | | G11B 20/10 |
| | | | | 386/243 |
| 2005/0071347 A1* | 3/2005 | Chau | | G06F 17/218 |
| 2006/0075088 A1* | 4/2006 | Guo | | H04L 67/02 |
| | | | | 709/224 |
| 2007/0050760 A1* | 3/2007 | Liu | | G06F 8/37 |
| | | | | 717/143 |
| 2007/0136658 A1* | 6/2007 | Feigenbaum | | G06F 8/38 |
| | | | | 715/207 |
| 2008/0295005 A1* | 11/2008 | Salesin | | G06F 17/30905 |
| | | | | 715/763 |
| 2009/0007160 A1* | 1/2009 | Wei | | G06F 8/41 |
| | | | | 719/328 |
| 2009/0064091 A1* | 3/2009 | Tonkin | | G06F 8/51 |
| | | | | 717/104 |
| 2010/0332968 A1* | 12/2010 | Squillace | | G06F 9/542 |
| | | | | 715/234 |

OTHER PUBLICATIONS

United States Office Action, U.S. Appl. No. 12/879,788, Mar. 1, 2012, fifteen pages.

* cited by examiner

EFFICIENT EVENT DELEGATION IN BROWSER SCRIPTS

CROSS-REFERENCE TO RELATED APPLICATIONS

This application is a continuation of U.S. patent application Ser. No. 13/615,151, filed on Sep. 13, 2012, which is a continuation of U.S. patent application Ser. No. 12/879,788, filed on Sep. 10, 2010, now issued as U.S. Pat. No. 8,307,277, each of which is incorporated by reference herein in its entirety.

BACKGROUND

This invention relates to web applications that use browser scripts in markup language documents, and in particular to efficient event delegation in web applications that execute scripts in browsers.

A browser application allows a user to retrieve and present information from resources on a network, such as the Internet or a private network. Browser applications allow users to interact with the resources on the network via a user interface. For example, a user can send a message to another user with the help of a web application. The user interacts with a user interface of the application to perform various actions including entering the message and clicking on a button to send the message. The user interface responds to user inputs by performing appropriate actions. For example, when the user clicks the send button in the above application, the browser collects information provided by the user and transmits the information to a web server with instructions to send the information to another user.

A web server sends information to a browser application running on a client device in the form of documents written in a markup language, such as Hypertext Markup Language (HTML). A markup language document retrieved by a browser application contains data and instructions that are executed on by the browser application. For example, a markup language document can include scripts for execution by a scripting engine of the browser application. An example of a scripting language supported by browser applications is JAVASCRIPT.

Web applications often use event-driven programming model in which the flow of the program is determined by events. An event is an action typically initiated outside the scope of a program, for example, mouse click or key press that is handled by instructions in the program. The set of instructions in a program that handle an event is called a handler or event-handler. Typically event handlers are associated with certain markup language elements, for example hyper text markup language (HTML) elements including links, buttons or images. In web applications, a user performs actions that result in creation of events that cause one or more handlers specified in the webpage to be invoked so as to execute certain actions. Examples of user actions resulting in events include clicking on a button or a link, pressing a key on the keyboard, moving the mouse over an element, moving the mouse away from an element etc.

A large number of event handlers may be defined for a web page. A webpage may be represented using a hierarchical structure, for example using a document object model (DOM) tree. The hierarchical structure has one or more root nodes that do not have any parent nodes. A mechanism to delegate events is to register the handler with a representation of the entire web page, for example the root node. Every event is matched against every handler associated with the web page to check if the handler should be executed for the given event. There can be several hundreds or thousands of event handlers defined for some web pages. As a result, selecting the correct set of handlers for execution in response to a user action can be a performance intensive operation. Going through all handlers to determine the set of handlers to be executed in response to an event takes time proportional to the number of handlers. If the number of handler is large, going through all handlers for each event can result in an application that responds slowly and provides an inferior user experience. Since every user interaction results in events, an inefficient method for processing handlers for an event adversely affects the performance of the application, resulting in slow response to user actions.

SUMMARY

Embodiments of the invention allow efficient execution of event handlers specified in a markup language document of a web application. The markup language document is represented in the web browser as a hierarchical structure of nodes that represent elements of the markup language document. The nodes are connected by edges. The hierarchical structure has a root node connected to other nodes via paths of nodes and edges. A subset of the nodes is mapped to node types that define how a node and its descendants respond to events. The markup language document specifies mapping from sets of node types to sets of handler functions. In response to an event associated with a node, all node types encountered in a path connecting the node with the root node are obtained. The mapping from the sets of node types to the set of handlers is inspected to identify a set of node types encountered in the path. The set of handlers associated with the identified set of node types is executed in response to the event.

In an embodiment, each individual node type is associated with a handler set. If an event associated with a node is received, the typed nodes in the path connecting the node and the root node are identified. The sets of handlers associated with the typed nodes encountered in the path are analyzed to determine the handlers to be executed in response to the event. The set of handlers that are executed may be obtained by taking an intersection of the sets of handlers encountered in the path.

An example of hierarchical structure of nodes used for representing a markup language document is a DOM tree. The handlers can be specified using a scripting language, for example JAVASCRIPT. User actions resulting in events include mouse clicks or key presses. Nodes can be represented in the browser as user interface elements, for example, links, buttons or images. Nodes can be associated with metadata used for distinguishing nodes of the same node type.

The features and advantages described in this summary and the following detailed description are not all-inclusive. Many additional features and advantages will be apparent to one of ordinary skill in the art in view of the drawings, specification, and claims hereof.

Figure 1:
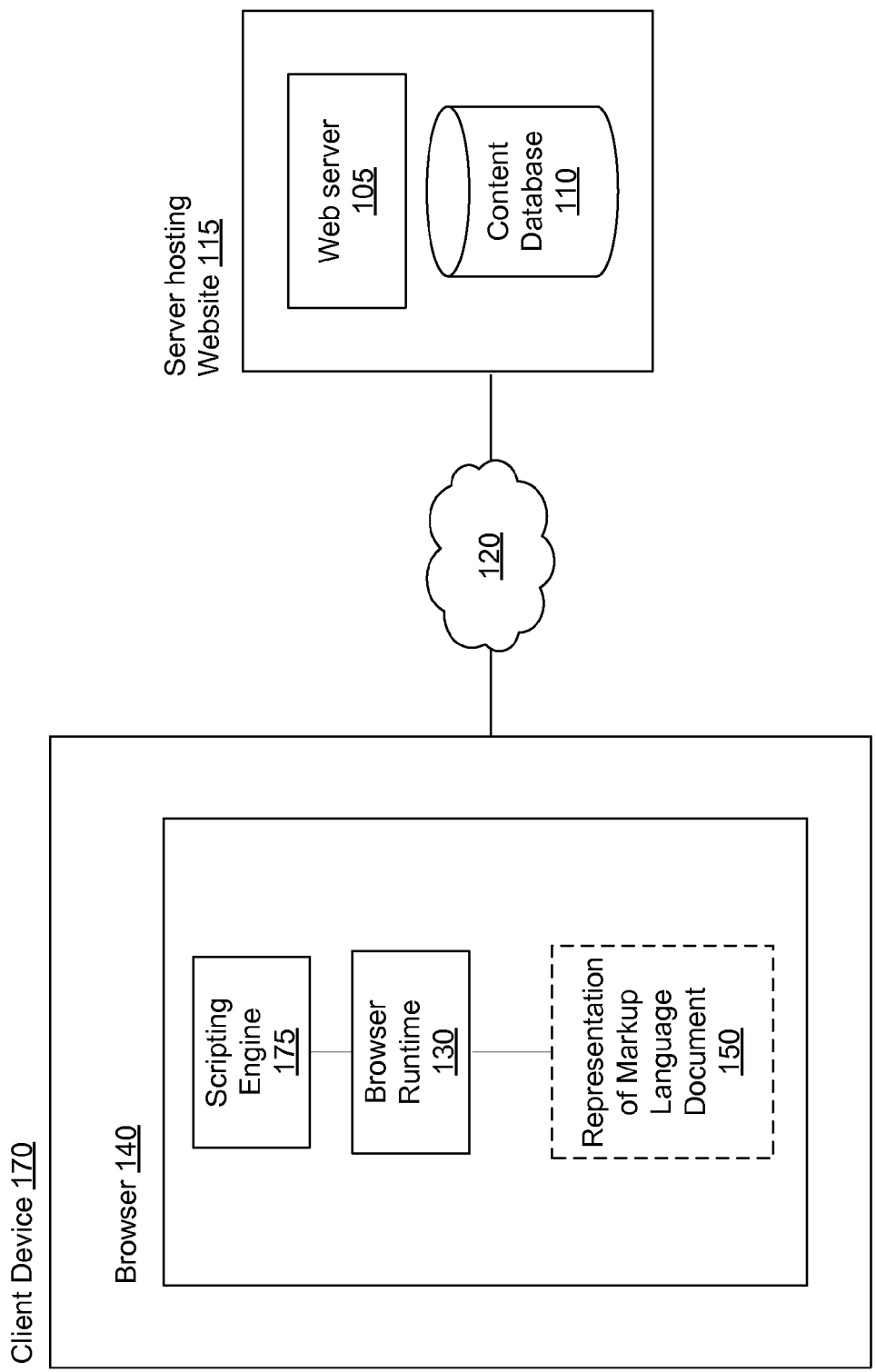
FIG. 1 is a diagram showing the system environment illustrating a client device running a browser application interacting with a website, in accordance with one embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A browser is used to present a user interface for a web application. The browser presents a visual representation of a markup language document associated with the web application. A user may interact with the browser using actions performed via peripheral devices, for example, a mouse or keyboard. The user action results in generation of an event that is processed by the browser. For example, if the user clicks on a button of a hyper text markup language (HTML) document presented using the browser, a "click" event associated with the HTML element representing the button is generated. The markup language document may specify handlers to be executed in response to an event. Since the number of handlers provided by a markup language document can be significantly large, the process of identifying the appropriate handlers to execute for an event can be time consuming.

Embodiments of the invention allow efficient methods for identifying the handlers in a markup language document for execution in response to an event. The browser represents the markup language document as a hierarchical structure comprising interconnected nodes. An example of a hierarchical representation for a web page is a DOM tree. The hierarchical representation of the nodes has a root node. Certain nodes of the hierarchical representation are associated with types specifying how events associated with the typed node and its descendants are handled. Sets of types of nodes are associated with one or more event handlers. If an event associated with a node is generated, the path connecting the node to the root node is analyzed. A set of types encountered in the path connecting the node to the root node is identified. This set of types in the path is looked up in the mapping from sets of types to handler sets. The set of handlers associated with this set of types associated with the path is obtained from the mapping and executed for the event. Therefore handlers for an event can be identified without inspecting all the available handlers in the markup language document. Accordingly, addition of more handlers to the markup language document does not degrade the performance of identifying handlers for individual events.

Furthermore, embodiments allow specification of handlers based on types of nodes and not for individual instances of nodes. Since the distinct types of nodes in the markup language document is typically much less than the number of instances of nodes, the number of handlers specified in the markup language document is significantly less. The ability to map sets of types of nodes to sets of handlers allows the same node type to result in invocation of different handlers depending on the context, i.e., the other types in the set. For example, the handlers associated with a type A in combination with type B can be different from the combination of the same type A with type C. More specifically, a "like" button in a "news" tag can behave different from a "like" button in a "photo" tag since different handler sets can be defined for a type sets {"news", "like"} and {"photo", "like"}. Therefore if the "like" node appears under a "news" node in the markup language document, a "click" action results in different handlers being invoked than when the "like" node appears under a "photo" node.

Therefore, embodiments allow an application developer to specify behavior for nodes at an abstract level, in terms of node types rather than for individual instances of nodes. Furthermore, application developer can control the behavior of nodes based on the context in which the node appears. The same type of node results in different handlers being executed under different contexts. Metadata can be attached to individual nodes, thereby allowing the handler code to distinguish between different instances of a type of node.

System Architecture

FIG. 1 is a diagram illustrating the system architecture of a client device 170 running a browser application 140 interacting over the network 120 with a server 115 hosting a website. The server 115 includes a web server 105 and a content database 110. The client device 170 includes a browser application 140. The browser application 140 includes a browser runtime 130, a scripting engine 175, and a representation of markup language document 150. In other embodiments, the client device 170 and/or the server 115 may include additional, fewer, or different modules for various applications. Conventional components such as network interfaces, security mechanisms, display monitors, keyboards, and the like are not shown so as to not obscure the details of the system.

The client devices 170 is a computing device that can receive user input and can transmit and receive data via the network 120. For example, the client devices 170 may be desktop computers, laptop computers, smart phones, personal digital assistants (PDAs), or any other device including computing functionality and data communication capabilities. The client devices 170 are configured to communicate via network 120, which may comprise any combination of local area and/or wide area networks, using both wired and wireless communication systems. The web server 105 links the website hosted by server 115 via the network 120 to one or more client devices 170. The web server 105 serves web pages, as well as other web-related content, such as Java, Flash, XML, and so forth. The content served by the web server 105 is stored in the content database 110. In an embodiment, the communication between a web server and the browser application uses the hypertext transfer protocol (HTTP).

The browser application 140 allows a user to retrieve and present information available in resources available on the internet or a private network. The web server 105 sends a markup language document 150, for example, an HTML document to the browser application 140. The browser application 140 presents information to the user as well as allows the user to provide input. The user input may comprise data provided by the user or requests from the user which is sent to the server 115. The server 115 hosting the website may respond by providing further information in the form of a markup language document 150. The markup language document 150 comprises information and instructions for rendering the information and for responding to actions taken by the user.

The browser runtime 130 processes a markup language document, renders it for display, and takes actions based on instructions provided in the markup language document. Some embodiments of browser runtime 130 include a scripting engine 175 for processing instructions provided using a client-side scripting language, for example, JAVASCRIPT. The markup language document may include instructions specified using the client-side scripting language supported by the scripting engine 175.

Figure 2:
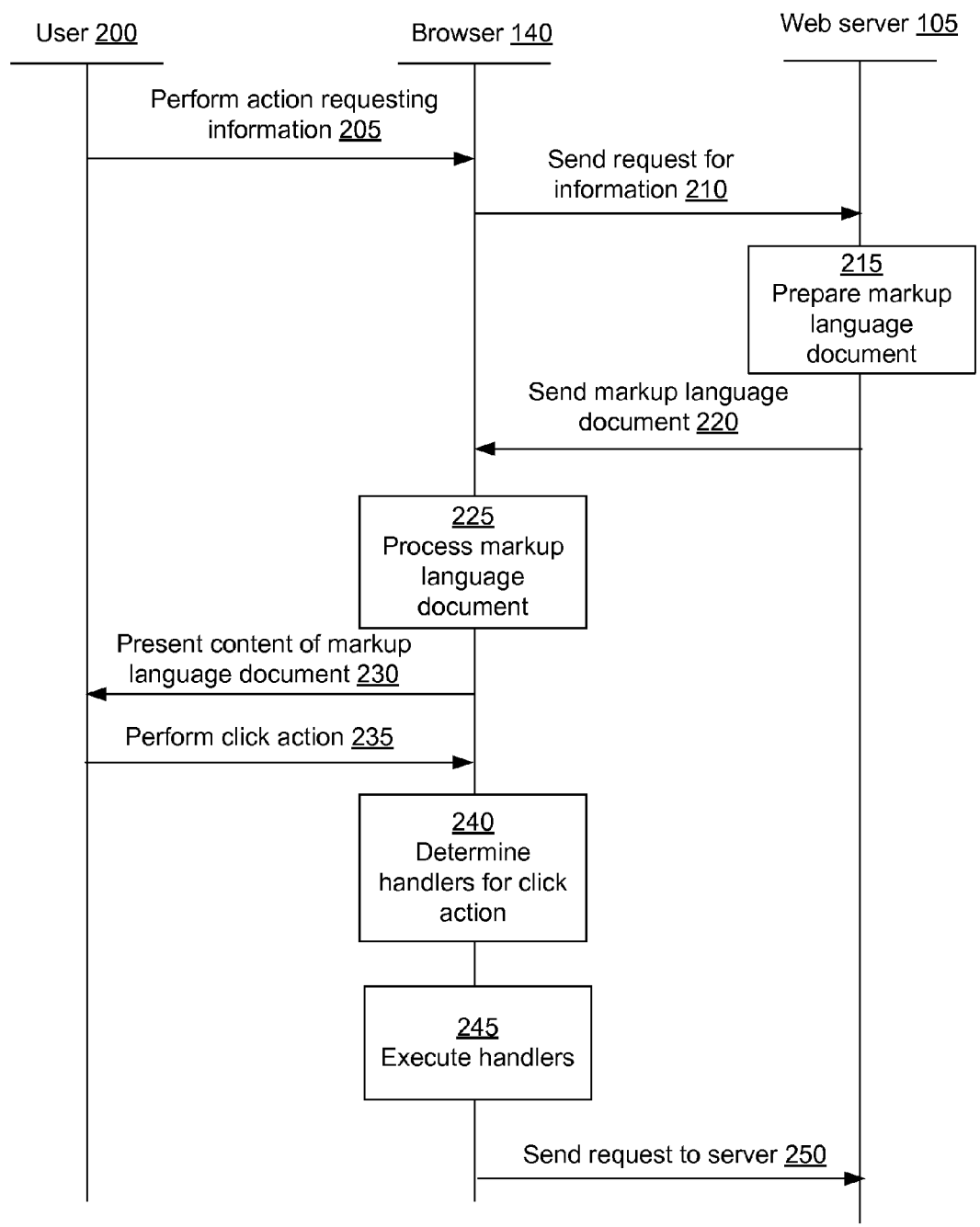
FIG. 2 is an interaction diagram of a process in which a user interacts with a browser and performs actions that invoke handlers defined in a markup language document, in accordance with one embodiment of the invention.

FIG. 2 shows an interaction diagram of a process in which a user 200 interacts with a web server 105, using a browser 140, in accordance with one embodiment of the invention. The user 200 performs 205 an action requesting information from the web server 105 using the browser 140. For example, the action performed 205 can be clicking on a button on a uniform resource location (URL) link displayed on browser 140. The browser 140 sends 210 a corresponding request for information to the web server 105 via the network 120. The web server 105 prepares 215 the markup language document in response to the request. For example, the user can make a request for making an online purchase and the markup language document can present a user interface to the user to provide further input for the online purchase. The web server 105 sends 220 the markup language document to the browser 140.

The browser presents the markup language document received from the web server to the user and allows the user to perform actions associated with the markup language document. As shown in FIG. 2, the browser 140 processes 225 the markup language document received from the web server 105. The processing 225 comprises building a representation of the markup language document 150. The markup language document can be represented in the memory of the client device 170 as a hierarchical tree structure, for example, a DOM tree. Representing the markup language document as a hierarchical tree allows the browser runtime 130 to traverse different nodes of the hierarchical structure. The markup language can include code or instructions specifying how to handle interactions with the user interface. These sets of instructions are called handlers. In an embodiment, the handlers correspond to functions that are executed in response to user actions which are called events. There can be events that are not directly caused by user actions, for example, certain event can be automatically fired by the browser at the end of loading of a webpage.

The browser 140 presents the user 200 with a representation of the markup language thereby allowing the user to perform actions associated with the markup language document. For example, the user can perform 235 a click action on a particular element displayed in the markup language document. The action performed 235 corresponds to an event triggered in the browser. The browser 140 determines 240 the handlers corresponding to the event associated with the action performed 235 by the user. There can be multiple handlers that are relevant to the event. If the handlers are specified as scripts, the browser runtime 130 executes the handlers using the scripting engine 175. Other actions may be performed as a result of execution of the handlers. For example, the browser 140 may send 250 another request to the web server 105 to either provide additional information or/and to perform certain action, for example, store certain information in a database. The above process can be repeated multiple times in a session that comprises a series of actions performed by the user as well as a series of interactions between the web server 105 and the browser 140.

Figure 3:
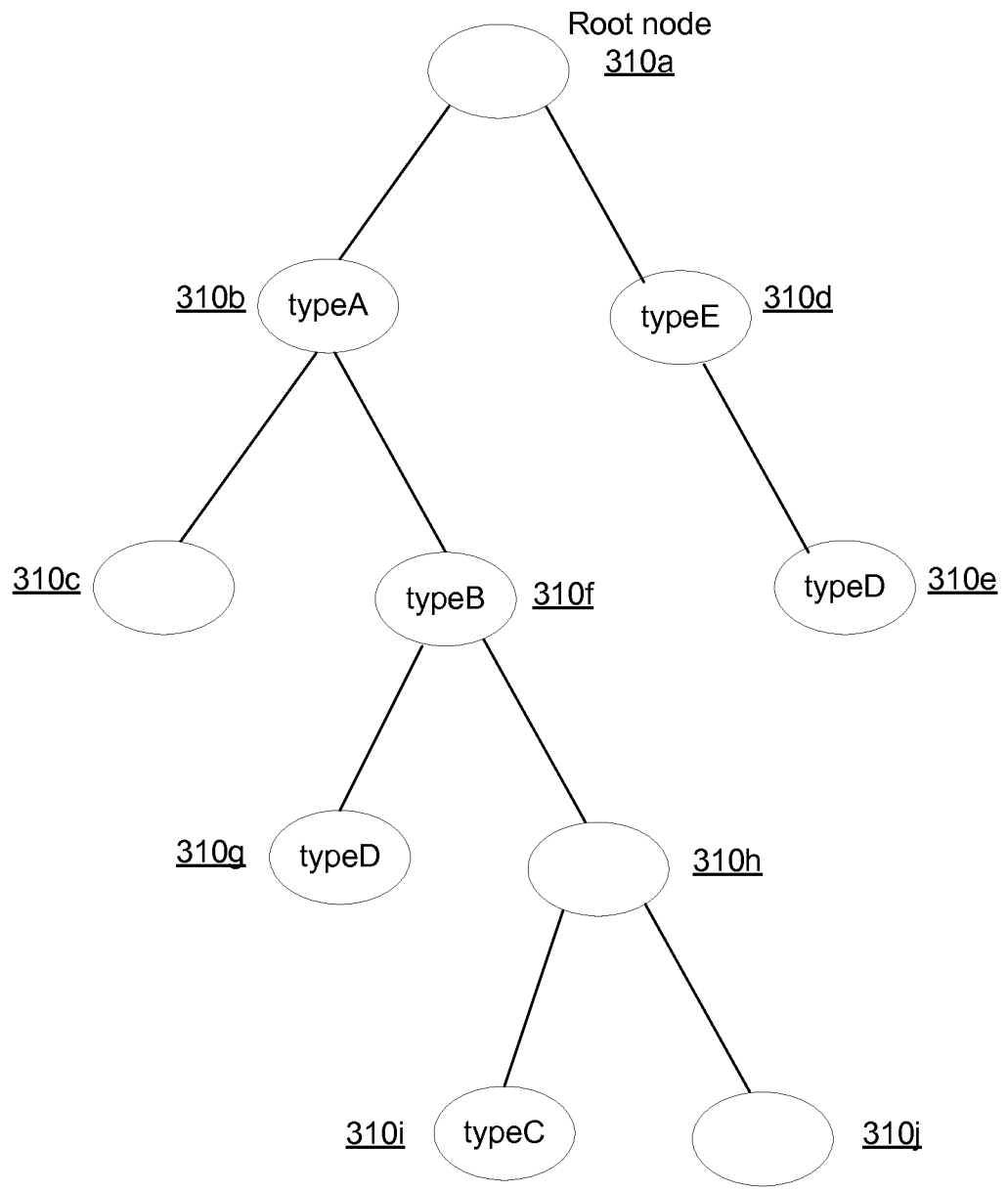
FIG. 3 illustrates the hierarchical structure representing a markup language document with typed nodes for efficiently identifying handlers associated with an event, in accordance with one embodiment of the invention.

FIG. 3 illustrates a hierarchical structure representing a markup language document with typed nodes for efficiently identifying handlers associated with an event, according to an embodiment of the invention. The nodes 310 of the hierarchical representation may correspond to elements that are displayed in the browser, for example, URL links, buttons, and images. Some nodes may not have a corresponding visual representation in the browser. (A letter after a reference numeral, such as "310a," indicates that the text refers specifically to the element having that particular reference numeral, while a reference numeral in the text without a following letter, such as "310," refers to any or all of the elements in the figures bearing that reference numeral.)

If there is an edge connecting two nodes, the nodes have references to each other. Therefore, the edges shown in FIG. 3 are bidirectional. In some embodiments, edges can be unidirectional. The edges between the nodes allow program code that has access to a particular node to access other nodes connected to the node via edges. For example, given access to a node, the program code can identify its parent node as well as children nodes if any. The nodes that can be reached by following the parent links from a node are the ancestors of the node. The set of ancestors of a node is assumed to include the node itself. For example, the ancestors of node 310f include nodes 310f, 310b, and 310a. Similarly, the set of nodes that can be reached by following the child links are the descendants of a node. The set of descendents of a node is assumed to include the node itself. For example, the descendants of node 310f are nodes 310f, 310g, 310h, 310i, and 310j.

Some nodes of the hierarchical representation may be associated with a node type. The type of a node represents the behavior of the descendants of the node (including the node itself) and defines the handlers associated with them. For example, in FIG. 3, node 310b has type "typeA," node 310d has type "typeE," node 301f has type "typeB," and so on. More than one node can have the same type. For example, both nodes 310e and 310g have type "typeD." The node 310a is the root node of the hierarchical representation since it does not have any parent node. In an embodiment, there can be multiple root nodes. Furthermore, a node can have multiple types. For example, in a web page of a social networking website, a node can represent a news-feed story and therefore have a type "story" as well as type "photo."

In an embodiment, the markup language document provides a mapping from sets of types to sets of handlers for a given event. The mapping provides the handlers to be invoked for an event if the given set of types corresponds to the set of types encountered in the path from the node to the root node. Table I shows a sample mapping based on FIG. 3 that relates sets of types with actions and sets of handler.

TABLE I

| Set of Types | Event Type | Handlers |
|---|---|---|
| {typeA, typeB, typeC} | event1 | F1 {... }, F2{...}, F3{...} |
| | event2 | F1 {... }, F5{...}, F6{...} |
| {typeA, typeB, typeD} | event1 | F1 {... }, F4{...}, F7{...} |
| | event2 | F3 {... }, F6{...}, F4{...} |
| {typeE, typeD} | event1 | F2{...}, F3{...} |
| | event2 | F3 {... }, F6{...}, F5{...} |

For example, as shown in Table I, the set {typeA, typeB, typeC} is mapped to handlers defined using functions F1, F2, and F3 for event "event1." The same set of types {typeA, typeB, typeC} is mapped to handlers defined using functions F1, F5, and F6 for event "event2."

The set of types in the mapping can be a subset of the set of types encountered in the path from the node to the root node. For example, the set of types encountered in the path from the root node to a given node {typeA, typeB, typeC, typeF} matches a set of types {typeA, typeB, typeC} in the Table I above. This may result in multiple sets of types from the mapping table matching a set of types in the path. For example, the set of types in the path from the root to a node {typeA, typeB, typeC, typeD} matches sets {typeA, typeB, typeC} and {typeA, typeB, typeD} each having a separate entry in the mapping Table I. The handlers corresponding to both the entries in the mapping table may be executed for an event associated with this node.

A node is associated with a set of types if the types are encountered while traversing from the root to that node using the edges of the hierarchical representation. For example, the path from the root node to the node 310*g* comprises nodes 310*a*, 310*b*, 310*f*, and 301*g*. The nodes 310*b*, 310*f* and 310*g* have types typeA, typeB, and typeD respectively. Therefore, the set of types {typeA, typeB, typeD} is associated with the node 310*g*. Accordingly, if event of type event1 is received by the node 310*g*, the set of handlers for the corresponding combination of set of types and event type is executed, i.e., F1 { . . . }, F4 { . . . }, F7 { . . . }. Similarly, the set of types {typeA, typeB, typeC} is associated with the node 310*i* and set of types {typeE, typeD} is associated with the node 301*e*. Handlers for the corresponding nodes for a given event can be obtained by looking up the set of node types and the event in the Table I. In another embodiment, any one of the matching entries may be executed for the path by resolving the conflicts based on certain criteria, for example, by specifying priorities with the sets of types and selecting the entry with highest priority (further conflicts resolved by randomly picking any one entry).

In an embodiment, the sets of types of nodes are associated with handlers by executing instructions in a script provided in the markup language document. For example the following instructions add functions F1, F3, F4 to the set of types {'typeA','typeB','typeC'} for an event type "click" and functions F6 and F7 to the same set of types for the event type "mouseover."

```
listen("click", ['typeA','typeB','typeC'], F1(e) {/* code / };
listen("click", ['typeA','typeB','typeC'], F3(e) {/* code / };
listen("click", ['typeA','typeB','typeC'], F4(e) {/* code / };
listen("mouseover", ['typeA','typeB','typeC'], F6(e) {/* code / };
listen("mouseover", ['typeA','typeB','typeC'], F7(e) {/* code / };
```

In an embodiment, the function specified as a handler has a reference to an event data structure that provides information defining the context of the event. The event data structure is specified as the value "e" passed as an input argument to the handler functions. For example, the event data structure may provide access to the node of the markup language document associated with the event.

The markup language document may include instructions to associate some metadata with a node. This metadata can be used, for example to distinguish between two different nodes that are associated with the same type. This metadata is also accessible with the event data structure that is available to the handler. The following markup language document portion illustrates how arbitrary data can be associated with nodes.

```
<div nodetype="news" meta={array('story_id' => 1439)}>
    First news story.
    <button nodetype="like">Like</button>
</div>
<div nodetype="news" meta={array('story_id' => 2987)}>
    Second news story.
    <button nodetype="like">Like</button>
</div>
```

This markup language snippet may not be represented using standard extensible hypertext markup language (XHTML) but may require preprocessing to generate standard XHTML. The generated XHTML can include hypertext markup language (HTML) as well as script code specified using a scripting language, for example, JAVASCRIPT.

As illustrated in this example, the markup language document includes two nodes that have node type "news," each node having a child node with node type "like." The two nodes of the type "news" can be distinguished by attaching the metadata using the "meta" attribute that associates a "story_id" with each news story. If a user clicks on the "like" button associated with a "news" tag, the handler code can retrieve the story_id value by traversing the structures provided to the handler. The story_id can be used by the handler code, for example to update a count of "like" inputs received for the story in a database on the server 115. Therefore clicks on the two like buttons update the count for two different stories specified as two different rows in a table in a database.

In one embodiment, the sets of types mapped to the sets of handlers are ordered sets. Accordingly, a set of types matches a path only if the types are encountered in a particular order while traversing the path, for example the set of types {typeA, typeB, typeC} must be encountered in the order specified while traversing from the root to the node in order to consider the set a match. If the order of types encountered while traversing from root to the node is {typeB, typeC, typeA}, the set is not considered a match with the ordered set {typeA, typeB, typeC}.

The set of handlers executed for a given node when a user performs an action resulting in an event is determined by identifying the set of node types encountered by traversing from the node to the root node (or from the root node to the node) and then looking up the set of handlers associated with the set of types for the event using the mapping in Table I. Each time the user performs an action resulting in an event associated with a node, the set of handlers associated with the node for the event is determined and executed.

Figure 4:
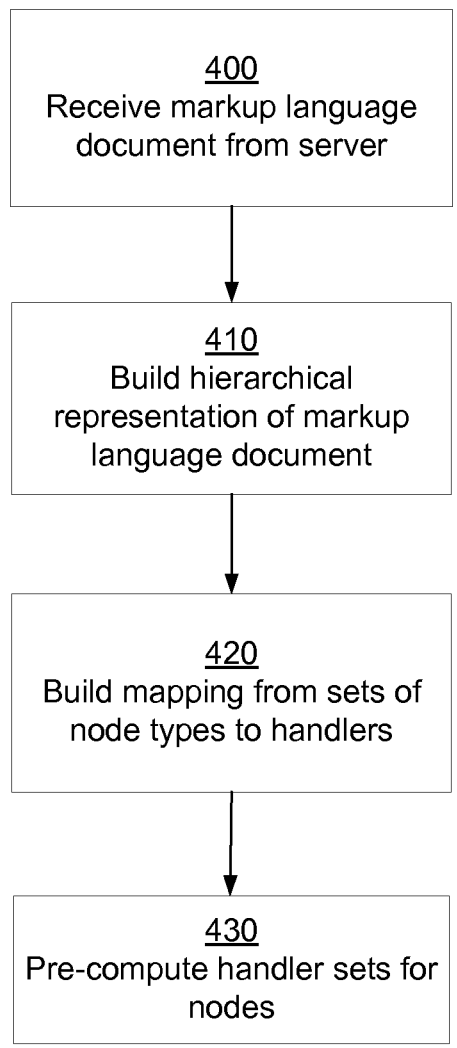
FIG. 4 is a flowchart of a process executed when a markup language document is loaded by the browser, in accordance with one embodiment of the invention.

FIG. 4 shows a flowchart of a process executed when a markup language document is loaded by the browser, in accordance with one embodiment of the invention. The browser 140 receives 400 a markup language document from the web server 105. This markup language document may be received in response to a user request. The browser 140 builds a hierarchical representation of the markup language document as shown in FIG. 3. The markup language document provides a mapping from sets of node types to handler sets for individual actions resulting in events. The browser runtime 130 builds 420 a data structure representing the mapping from sets of node types to handler sets for individual actions. The browser 140 pre-computes handler sets for specific nodes. For example, if the hierarchical representation of the markup language document is as shown in FIG. 3, the browser 140 can determine the handler sets to be executed for each node corresponding to a user interface element, for example, nodes 310*i*, 310*j*, 310*g* etc. The browser 140 waits for user to perform actions resulting in events. Whenever the user performs an action resulting in an event associated with a node, the browser determines the handler sets to be executed from the pre-computed handler sets for each node and executes them.

Pre-computing the handlers associated with the nodes of the markup language document allows optimization of the script code that is retrieved when the markup language document is loaded. Since the required handlers that for the markup language document can be pre-computed, only the required handlers are retrieved when the document is loaded in the web browser without having to load the rest of the handlers. This improves the performance of loading the markup language document.

If pre-computing is determined to be an expensive operation, the handler sets may be pre-computed for a subset of nodes. For example, certain nodes may be tagged in the markup language as nodes for which handler sets should be pre-computed. These nodes are expected to be nodes that are highly likely to be associated with an event, for example, buttons on which a user is highly likely to click. As an example, a user may be more likely to click on a submit button after filling a form but may be less likely to click on a button for asking a question to a technical support person. In an embodiment, the user clicks may be analyzed based on historical data to identify nodes that need to be pre-computed. For example, buttons or links that are historically identified as nodes on which users click at a higher rate than other buttons may be pre-computed. The other nodes for which the handler sets are not computed require additional processing if an event in encountered for the node since the handler set is computed after receiving the event before the handlers can be executed.

Figure 5:
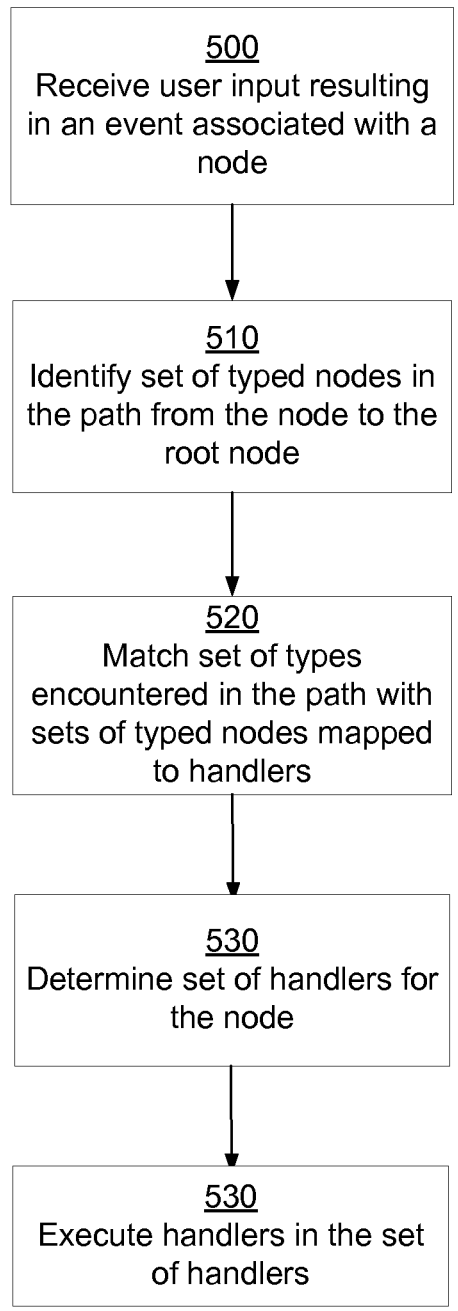
FIG. 5 is a flowchart of a process for determining handlers to be executed in response to an event associated with a node of the hierarchical representation of a markup language document, in accordance with one embodiment of the invention.

FIG. 5 shows a flowchart of a process for determining handlers to be executed in response to an event associated with a node of the hierarchical representation of a markup language document, in accordance with one embodiment of the invention. Once the appropriate data structures are set up by the browser 140 upon loading of a markup language document, the browser 140 waits for the user to perform actions. The browser 140 receives 500 user input corresponding to a user action, for example clicking on a user interface element corresponding to a node resulting in generation of an event associated with the node.

The path from the node to the root node is traversed to identify 510 a set of types associated with nodes in the path. The set of types encountered in the path are matched with the sets of types mapped to the actions and handlers as illustrated in Table I. If a matching set of types is identified, the set of handlers for the set of types for the given action is determined 530. The set of handlers is executed in response to the event. Therefore the set of handlers to be executed for an event determined without inspecting all the events associated with the markup language document.

If the set of handlers to be executed for an event is pre-computed for each node of the markup language document that is associated with a user interface element, there is no need to traverse from the node to the root node. The appropriate set of handlers for the given event and the given node is retrieved and executed.

Figure 6:
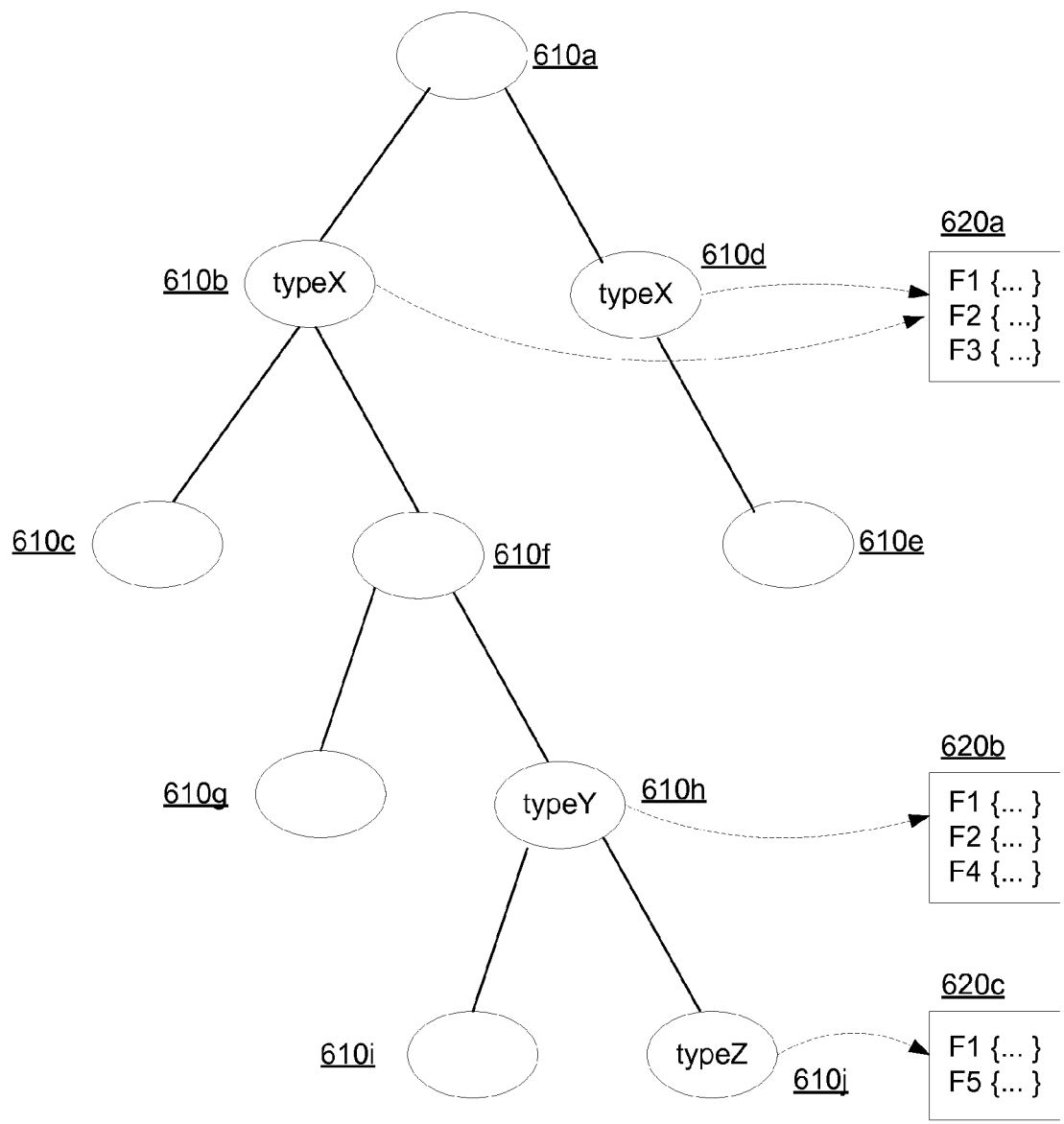
FIG. 6 is another representation of the markup language document associating sets of handlers with nodes to determine handlers to be executed in response to an event associated with a node, in accordance with one embodiment of the invention.

FIG. 6 is another representation of the markup language document, in accordance with one embodiment of the invention. As shown in FIG. 6, nodes of the hierarchical representation of the markup language document can be typed and each node type is associated with a set of handlers for a given event type. Therefore by associating a node with a type, the node is associated with a set of handlers for the given event. The handlers associated with a typed node as illustrated in FIG. 6 determine the behavior of descendants of the node (including the node itself). For example, the node 610*d* is associated with the handler set 620*a*. The node 610*d* defines the behavior of the node 610*e* and the node 610*d*. Similarly, the node 610*h* associated with handler set 620*b* defines the behavior of the nodes 610*h*, 610*i*, and 610*j*, i.e., the descendants of the node including the node itself.

The handlers to be executed for a node are determined by the handler sets associated with the ancestors of the node (including the node itself). For example, the handlers to be executed for an event associated with node 610*j* is determined by the handler sets associated with nodes 610*j*, 610*h*, and 610*b* which are typed nodes that are ancestors of the node 610*j*.

In an embodiment, the handlers to be executed in response to a given event associated with the node is determined as the intersection set of all the handlers associated with the ancestors of the node (including the node itself). The intersection set can be obtained by traversing the path from the node to the root node by following the parent link of each node encountered, until there is no parent link to be followed when the root node is reached, The handler sets of the nodes encountered while traversing this path are accumulated. The handlers may be tagged to identify the intersection set of the sets of handlers. The tags can be compared to determine whether the handler is associated with each typed node encountered in the path. If the handler is associated with each typed node encountered in the path, the handler belongs to the intersection set of all the handler sets encountered in the path. Otherwise the handler is excluded from the intersection set. All handlers belonging to the intersection set are executed in response to the event.

The hierarchical representation shown in FIG. 6 can be obtained from the hierarchical representation shown in FIG. 3. For example, given a mapping from sets of types to handler sets (as shown in FIG. 3), the mapping from a type T to a handler set (as shown in FIG. 6) can be obtained by (1) identifying all the sets of types as defined in Table I for the given event that include T and (2) taking a union of the handler sets associated with these sets of types. For example, in FIG. 3, typeB belongs to set {typeA, typeB, typeD} and set {typeA, typeB, typeC}. The handler set for typeB can be obtained by taking a union of the handler sets associated with these two sets for a given event.

Similarly, the hierarchical representation shown in FIG. 3 can be obtained from the hierarchical representation shown in FIG. 6. Given a handler set associated with each type (as shown in FIG. 6), the handler set associated with a set of node types (as shown in FIG. 3) can be obtained by taking the intersection set of the sets of handlers associated with each node type in the set for the given event.

Figure 7:
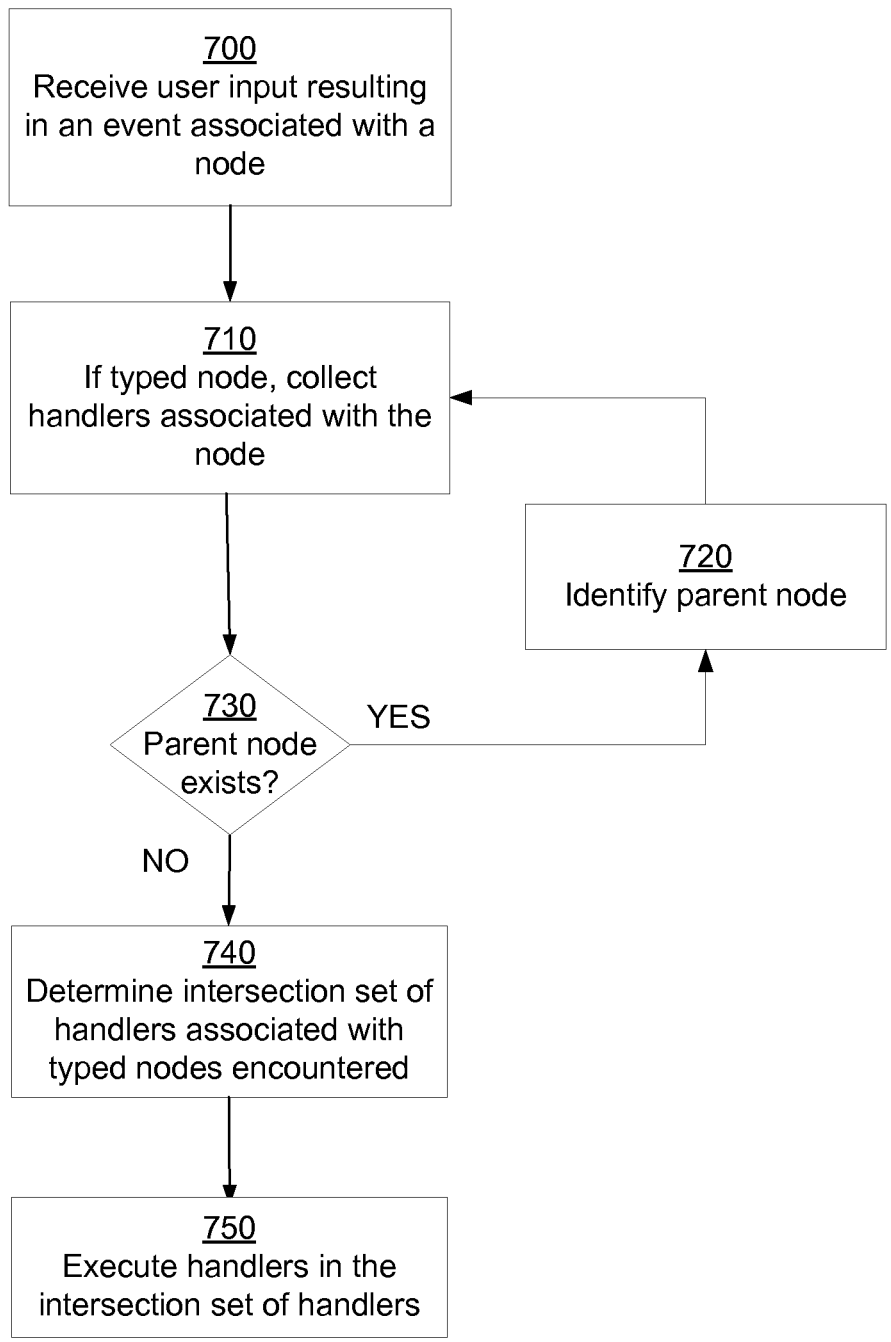
FIG. 7 is a flowchart of a process for determining handlers to be executed in response to an event associated with a node of the hierarchical representation of a markup language document illustrated in FIG. 6, in accordance with one embodiment of the invention.

FIG. 7 shows a flowchart of a process for determining handlers to be executed in response to an event associated with a node of the hierarchical representation illustrated in FIG. 6, in accordance with one embodiment of the invention. The browser 140 receives 700 user input corresponding to a user action, for example clicking on a user interface element resulting in generation of an event associated with the node corresponding to the user interface element.

The browser executes instructions that traverse from the node associated with the event to the root node of the hierarchical representation by identifying the parent of each node along the path. If the current node in the path is a typed node, the handlers associated with the typed node for the given event are collected in a data structure. The browser runtime 130 performs 730 a check to determine whether the parent of the node exists. If the parent of the node exists, the parent node is identified 702 and processed. If there is no parent node of the current node, the current node is the root node and the traversal of the path is completed. The accumulated handlers are analyzed to determine 740 the intersection of all the sets of handlers encountered in the path. The handlers in the intersection set are executed in response to the event.

In an embodiment, the number of times each handler is encountered in the path from the node to the root node is determined. The number of typed nodes in the path is also determined. If the count of the number of occurrences of the handler is same as the number of typed nodes encountered in the path, the handler is determined to belong to the intersection of the sets of handlers encountered. For example, if the number of typed nodes in the path is 3, each handler that is encountered three times while traversing the path from the node to the root belongs to the intersection of the sets of handlers.

As an example, assume that for the event type "click," the set of types {"newsfeed", "like"} is mapped to handler F1. A structure is created that stores the mapping {click[newsfeed]={F1:2}; click[like]={F1:2};} specifying that to be executed, the handler F1, two node types should be found in a path from root to the node, the node type "newsfeed," and the node type "like." If the click event is associated with a node with only two node types "photo" and "like" in the path from the root, the handler F1 does not get executed. This is so, because, even though the node type "like" is present in the path, the node type "newsfeed" is not present and the two node types required to trigger handler F1 do not exist in the path. On the other hand, if the path from the root to the node on which user executed "click" operation includes "newsfeed," "story," and " like," the handler F1 gets triggered since both types "newsfeed," and "like" are present in the path.

The same handler function may be associated with two sets of types, for example if the markup language document includes the instructions:

```
listen("click", ['typeA','typeB','typeC'], F1(e) {/* code / };
listen("click", ['typeE','typeF'], F1(e) {/* code / };
```

In the above example, both sets {typeA, typeB, typeC} and sets {typeE, typeF} are mapped to the same handler F1. The handler F1 for the each mapping entry can be treated as a separate function. Effectively, the above instructions in the markup language code can be treated as follows (the following may be intermediated code generated via a preprocessing step, or other data structures can be maintained to treat the two instances of handler F1 differently).

```
listen("click", ['typeA','typeB','typeC'], F1X(e) {/* code / };
listen("click", ['typeE','typeF'], F1Y(e) {/* code / };
```

As shown in the instructions above, the first instance of handler F1 is treated as handler F1X and the second instance of handler F1 is treated as F1Y. Upon execution of handlers F1X and F1Y the same set of instructions as F1 is executed. However, when the counts associated with the handlers are computed to determine the number of node types associated with each handler in a path from the root node to a given node, the two handlers are treated separately. For example, if types {typeA, typeB, typeC, typeE} are encountered in a path, the count for function F1X is determined to be 3 and the count for the handler F1Y is determined to be 1. Accordingly, F1X is executed. On the other hand, if the types {typeA, typeB, typeE} are encountered in a path, the count for function F1X is determined to be 2 and the count for the handler F1Y is determined to be 1. Therefore none of the handler functions are executed. If the two instances of F1 were not treated separately, the count associated with a single handler F1 could be treated as 3 and the handler executed incorrectly. Therefore, treating the handlers associated with different paths as distinct functions avoid the problem of miscounting as illustrated above.

If the same handler is associated with two different sets of types, the handler is tagged to distinguish the two associations. This ensures that is two sets of types in the mapping are found in a path from root to a given node, and both sets of types are mapped to a same handler, the counts associated with the two mappings are treated separately.

The embodiments disclosed herein allow handler sets to be executed in response to an event associated with a node to be determined without inspecting all the handlers specified in the markup language document. This provides for efficient execution of the handlers when a user performs an action related to an element of the markup language document. The ability to specify node types and handler sets associated with node types or paths of node types also allows an application developer to abstract the behavior of the elements in the markup language document based on a small set of node types rather than defining the behavior for each instance of node. Associating handler sets with paths of node types allows the application developer to specify implement different behavior for the same element based on the context in which the element appears in the markup language document. A markup language document can also be analyzed to determine the handlers likely to be executed based on the node types present in the markup language document. This allows the ability to load only a subset of script code associated with the handlers rather than load every handler specified with the document when the document is loaded in the browser.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
    receiving a markup language document comprising nodes associated with node types and associations between nodes;
    receiving a specification comprising a mapping from sets of node types to sets of handlers, wherein each set of node types specified in the mapping is mapped to a set of handlers;
    receiving a request associated with a target node of the markup language document;
    determining the handler associated with the node based on a context of the node in the markup language document, the context comprising a set of nodes associated with the target node in the markup language document, the determining comprising:
        identifying a set of node types for the target node and the set of nodes linked to the target node;
        identifying a set of handlers mapped to the identified set of node types based on the mapping from sets of node types to sets of handlers; and
        executing a handler from the identified set of handlers responsive to the request.

2. The computer implemented method of claim 1, wherein the target node is a first target node, the set of nodes is a first set of nodes, the context is a first context, and the set of node types if a first set of node types, wherein the markup language document includes a second target node having the type of the first target node, the second target node occurring in a second context comprising a second set of nodes, the determining comprising:
    identifying a second set of node types for the second set of nodes linked to the second target node;
    identifying a second set of handlers mapped to the second set of node types based on the mapping; and
    executing a second handler from the second set of handlers responsive to the request.

3. The computer implemented method of claim 1, wherein the set of nodes associated with the node is determined by traversing from the node to each node of the set based on the associations between nodes specified in the markup language document.

4. The computer implemented method of claim 1, wherein the mapping maps a pair of a set of node type and an event type with a set of handlers, wherein an event type is associated with a type of user input.

5. The computer implemented method of claim 4, further comprising:
    determining an event type corresponding to the received request associated with the target node; and
    wherein the identified set of handlers maps to the identified set of node types and the event type.

6. The computer implemented method of claim 1, wherein each set of node types of the mapping is an ordered set and the order of the identified set of node types is determined based on an order associated with the set of nodes.

7. The computer implemented method of claim 6, wherein identifying a set of handlers mapped to the identified set of node types comprises:
    selecting a matching set of node types in the mapping such that the order of the node types of the matching set matches the order of the node types of the identified set; and
    selecting a set of handlers mapped to the matching set of node types.

8. The computer implemented method of claim 1, wherein the markup language document comprises a hierarchical representation of nodes as a document object model (DOM) tree and the request is associated with one of a mouse click or a key press operation.

9. The computer implemented method of claim 1, wherein the target node is displayed in the browser as one of a link, button, or image.

10. The computer implemented method of claim 1, wherein a node is associated with a metadata attributes, wherein the handler executed uses the metadata attribute.

11. A non-transitory computer-readable storage medium storing instructions for:
    receiving a markup language document comprising nodes associated with node types and associations between nodes;
    receiving a specification comprising a mapping from sets of node types to sets of handlers, wherein each set of node types specified in the mapping is mapped to a set of handlers;
    receiving a request associated with a target node of the markup language document;
    determining the handler associated with the node based on a context of the node in the markup language document, the context comprising a set of nodes associated with the target node in the markup language document, the determining comprising:
        identifying a set of node types for the target node and the set of nodes linked to the target node;

identifying a set of handlers mapped to the identified set of node types based on the mapping from sets of node types to sets of handlers; and executing a handler from the identified set of handlers responsive to the request.

12. The non-transitory computer-readable storage medium of claim 11, wherein the set of nodes associated with the node is determined by traversing from the node to each node of the set based on the associations between nodes specified in the markup language document.

13. The non-transitory computer-readable storage medium of claim 11, wherein the mapping maps a pair of a set of node type and an event type with a set of handlers, wherein an event type is associated with a type of user input.

14. The non-transitory computer-readable storage medium of claim 11, wherein each set of node types of the mapping is an ordered set and the order of the identified set of node types is determined based on an order associated with the set of nodes.

15. The non-transitory computer-readable storage medium of claim 11, wherein a node is associated with a metadata attributes, wherein the handler uses the metadata attribute.

16. A non-transitory computer-readable storage medium containing one or more markup language documents for being rendered by a web browser application executing on a computer system, the one or more markup language documents comprising:
 a structure of nodes representing elements of a markup language document and edges connecting the nodes, wherein a subset of nodes is mapped to node types;
 a specification comprising a mapping from sets of node types to sets of handlers, wherein each set of node types specified in the mapping is mapped to a set of handlers;
 instructions to a web browser application executing on a computer system for executing handlers in response to a request associated with a target node, the instructions for causing the computer system to:
  determine a context of the node in the markup language document, the context comprising a set of nodes associated with the target node in the markup language document;
  identify a set of node types for the target node and the set of nodes linked to the target node;
  identify a set of handlers mapped to the identified set of node types based on the mapping from sets of node types to sets of handlers; and
  execute a handler from the identified set of handlers responsive to the request.

17. The non-transitory computer-readable storage medium of claim 16, wherein the set of nodes associated with the node is determined by traversing from the node to each node of the set based on the associations between nodes specified in the markup language document.

18. The non-transitory computer-readable storage medium of claim 16, wherein the mapping maps a pair of a set of node type and an event type with a set of handlers, wherein an event type is associated with a type of user input.

19. The non-transitory computer-readable storage medium of claim 16, wherein each set of node types of the mapping is an ordered set and the order of the identified set of node types is determined based on an order associated with the set of nodes.

20. The non-transitory computer-readable storage medium of claim 16, wherein a node is associated with a metadata attributes, wherein the handler executed uses the metadata attribute.

* * * * *